Oct. 2, 1928.
C. T. PFLUEGER
LUBRICATING DEVICE
Filed March 16, 1922
1,685,865
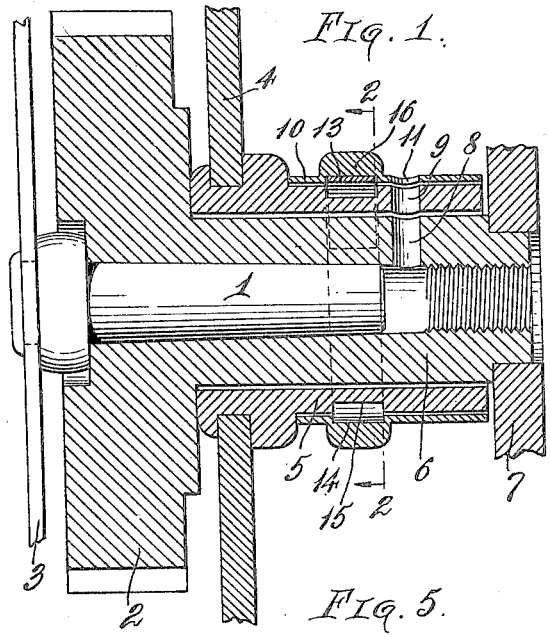
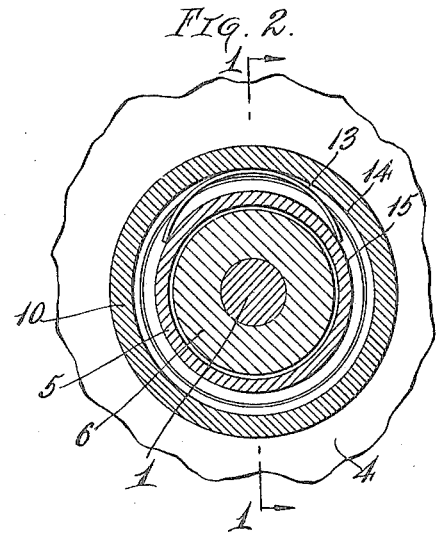
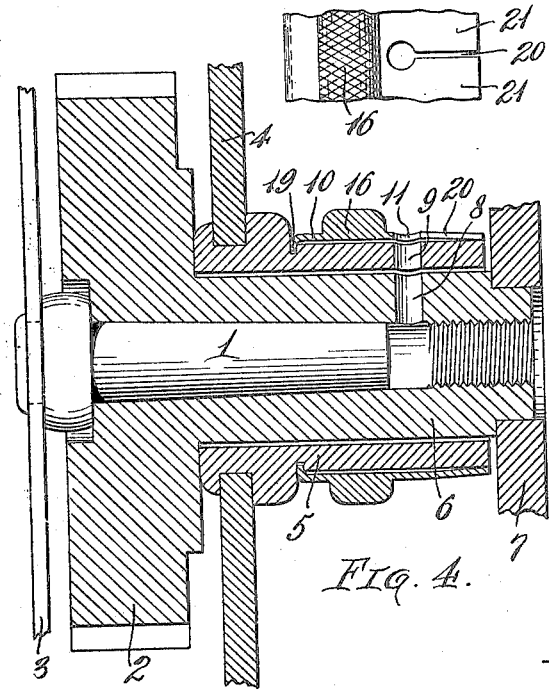
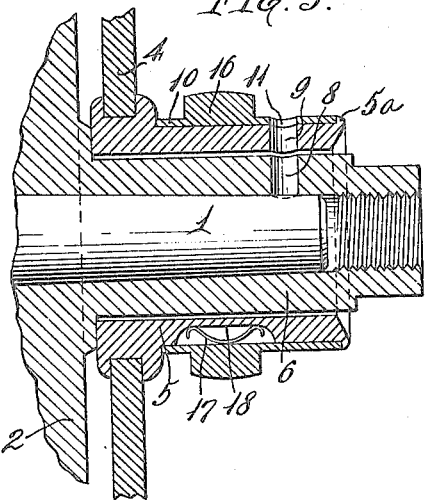
Inventor.
Charles T. Pflueger
By Brockett & Hyde
Att'ys.

Patented Oct. 2, 1928.

1,685,865

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

LUBRICATING DEVICE.

Application filed March 16, 1922. Serial No. 544,272.

This invention relates to improvements in lubricating devices such as are used upon fishing reels and the like.

The particular type of fishing reel to which the present invention relates is illustrated in my Patent No. 1,384,775 of July 19, 1921. In this type of fishing reel the rotatable spool shaft as well as other operating parts are usually mounted in what is known as the end head of the stationary frame.

The objects of the present invention are to provide an improved shaft bearing so arranged as to permit the lubricant to be readily supplied thereto and which is provided with a closing cap adapted to be turned to open position for lubrication and also to closed position to seal the bearing against the entrance of dirt and moisture; to provide improved friction means for holding the rotatable cap or sleeve in either open or closed position; and to provide a structure which is comparatively simple and which can be embodied in a fishing reel at minimum cost and which is so formed that the parts are not likely to become accidentally detached.

Other objects of the invention will be apparent from the following description and claim when considered together with the accompanying drawings.

Fig. 1 is a sectional view taken on line 1—1, Fig. 2, showing the present invention applied to the driving shaft of a fishing reel; Fig. 2 is a sectional view taken on line 2—2, Fig. 1; Figs. 3 and 4 are views similar to Fig. 1 and showing modified forms of my invention; and Fig. 5 is a detail plan view of the split collar or cap in Fig. 4.

In all of the several forms here illustrated, the post or shaft 1 for the main spool driving gear 2 is fixedly mounted in the inner wall 3 of the end head of the reel frame, while upon the outer wall 4 of the end head is mounted the collar 5 which surrounds the hub 6 of the gear 2. The shaft 1 and collar 5 are both secured to the inner and outer walls respectively, by beading or crimping, as plainly illustrated in the drawings. The crank 7 is attached to the outer end of the hub 6 for operation of the gear 2 and other gears (not shown) which are enclosed within the end head and are driven by the main driving gear 2 for rotation of the spool. An oil opening 8 is provided through the hub 6 and is adapted to be brought into registry with an opening 9 through the collar 5 for lubrication of the gear post or shaft 1. A cap in the form of a sleeve 10 is rotatably mounted upon the collar 5 and is provided with an opening 11 which is adapted to be rotated into registry with the openings 8 and 9 when it is desired to supply the lubricant or out of registry to close the opening. This cap may be removably mounted upon the collar 5, but preferably is provided with means for preventing its removal, or, in other words, for limiting the cap to rotary movement upon the collar 5. In all of the several forms of invention I have also provided means for frictionally maintaining the cap 10 in the position to which it is adjusted by rotation on the collar 5.

Referring to the form illustrated in Fig. 1, a spring 13 is seated in an annular groove or recess 14 formed in the cap 10, and upon sliding cap 10 onto collar 5 the ends of the spring 13 snap into the corresponding annular groove 15 provided in the collar 5 so as to occupy the position shown in the drawing. It will be understood that the cap 10 is applied in this manner before application of the handle 7. The annular rib 16, which is shown as being located in the same zone as the annular grooves 14 and 15, is provided with a knurled surface to facilitate rotary adjustment of the cap 10. Thus it will be seen that the cap 10, when once applied to the collar 5, is prevented from being removed therefrom and the friction of the spring between the collar 5 and the cap 10 maintains the cap in the position to which it is adjusted.

Referring to the form of invention shown in Fig. 3, the edge of the outer end of the collar 5 is spun outwardly, as indicated at 5ª, as a means of preventing removal of the cap 10; or in other words, to limit the cap 10 to rotary movement upon the collar 5. A spring 17 which seats in a longitudinal slot or recess 18 formed in the collar 5 provides frictional engagement between the collar 5 and the cap 10 so as to maintain the cap in the position to which it is rotatably adjusted.

Referring to Fig. 4, the cap 10 is maintained against removal from the collar 5 by having the inner end portion thereof spun into an annular groove formed in the collar 5, as indicated at 19. The slits 20 are provided in the outer end portions of the cap 10 so as to form spring tongues 21 as a means of maintaining the collar in the position to which it is rotatably adjusted.

Obviously, any one of the arrangements for frictionally holding the cap in its adjusted position, such as the springs 13 or 17 or the spring tongues 21 may be used with any one or more of the arrangements for preventing removal of the cap from the collar.

What I claim is:

In a fishing reel, spaced frame plates, an elongated bearing post fixed to the inner of said plates and projecting through an opening formed in the outer plate, a sleeve fixed in the opening of the outer plate and projecting outwardly beyond the same, a spool gear having an elongated hollow hub journalled on said post and in said sleeve, said post terminating short of the end of the hub to provide a lubricant chamber, said hub and sleeve having registering ports communicating with said chamber, and a rotatable cap on said sleeve frictionally retained against rotation and provided with an opening adapted to register with said ports.

In testimony whereof I hereby affix my signature.

CHARLES T. PFLUEGER.